US009626766B2

(12) United States Patent
Criminisi et al.

(10) Patent No.: US 9,626,766 B2
(45) Date of Patent: Apr. 18, 2017

(54) DEPTH SENSING USING AN RGB CAMERA

(71) Applicants: Antonio Criminisi, Cambridge (GB); Duncan Paul Robertson, Cambridge (GB); Peter Kontschieder, Graz (AT); Pushmeet Kohli, Cambridge (GB); Henrik Turbell, Stockholm (SE); Adriana Dumitras, London (GB); Indeera Munasinghe, Cambridge (GB); Jamie Daniel Joseph Shotton, Cambridge (GB)

(72) Inventors: Antonio Criminisi, Cambridge (GB); Duncan Paul Robertson, Cambridge (GB); Peter Kontschieder, Graz (AT); Pushmeet Kohli, Cambridge (GB); Henrik Turbell, Stockholm (SE); Adriana Dumitras, London (GB); Indeera Munasinghe, Cambridge (GB); Jamie Daniel Joseph Shotton, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/193,079

(22) Filed: Feb. 28, 2014

(65) Prior Publication Data
US 2015/0248765 A1 Sep. 3, 2015

(51) Int. Cl.
G06K 9/00 (2006.01)
G06T 7/00 (2017.01)

(52) U.S. Cl.
CPC .. *G06T 7/0051* (2013.01); *G06T 2207/10016* (2013.01); *G06T 2207/10024* (2013.01); *G06T 2207/20072* (2013.01); *G06T 2207/20081* (2013.01)

(58) Field of Classification Search
USPC .................. 382/106, 154, 155–167
See application file for complete search history.

(56) References Cited

U.S. PATENT DOCUMENTS

| | | | |
|---|---|---|---|
| 2002/0146169 A1* | 10/2002 | Sukthankar et al. ......... 382/170 |
| 2008/0137989 A1* | 6/2008 | Ng et al. ....................... 382/285 |
| 2008/0317331 A1* | 12/2008 | Winn et al. ................... 382/154 |
| 2009/0080699 A1* | 3/2009 | Ng-Thow-Hing et al. ... 382/103 |
| 2009/0284627 A1* | 11/2009 | Bando et al. ................. 348/273 |
| 2009/0290758 A1* | 11/2009 | Ng-Thow-Hing et al. ... 382/106 |
| 2010/0195867 A1* | 8/2010 | Kipman et al. ............... 382/103 |
| 2010/0322502 A1* | 12/2010 | Otsuka et al. ................ 382/133 |
| 2011/0293180 A1* | 12/2011 | Criminisi et al. ............ 382/173 |
| 2012/0014456 A1* | 1/2012 | Martinez Bauza et al. ........................ 375/240.25 |
| 2012/0051625 A1* | 3/2012 | Appia et al. .................. 382/154 |
| 2012/0159290 A1* | 6/2012 | Pulsipher et al. ............ 714/819 |
| 2012/0194644 A1* | 8/2012 | Newcombe .............. G06T 7/20 348/46 |

(Continued)

*Primary Examiner* — Alex Liew

(57) ABSTRACT

A method of sensing depth using an RGB camera. In an example method, a color image of a scene is received from an RGB camera. The color image is applied to a trained machine learning component which uses features of the image elements to assign all or some of the image elements a depth value which represents the distance between the surface depicted by the image element and the RGB camera. In various examples, the machine learning component comprises one or more entangled geodesic random decision forests.

20 Claims, 12 Drawing Sheets

(56) References Cited

U.S. PATENT DOCUMENTS

2012/0290510 A1* 11/2012 Faddoul .............. G06N 99/005
706/12
2012/0306876 A1* 12/2012 Shotton et al. .............. 345/424

* cited by examiner

DEPTH SENSING USING AN RGB CAMERA

BACKGROUND

Knowledge of the depth of an element is becoming more important in areas such as gaming, three dimensional (3D) scanning and fabrication, augmented reality and robotics, with particular importance in natural users interfaces. Specifically, the ability to reason about the 3D geometry of a scene makes the sensing of whole bodies, hands, and faces more tractable allowing these modalities to be leveraged for high degree-of freedom input.

Previous approaches to obtaining depth information have used a specialized depth camera. While depth cameras are becoming more of a commodity they have yet to surpass the ubiquity of regular two-dimensional (2D) cameras, now found in the majority of mobile devices and desktop workspaces. More widespread adoption of depth cameras is limited by considerations including power, cost and form-factor. So, despite recent advances in miniaturizing depth cameras, the need for custom sensors, high-power illumination, complex electronics and other physical constraints will often limit scenarios of use, particularly when compared to regular cameras. Accordingly, there is a need for a more cost effective way to obtain depth information.

The embodiments described below are not limited to implementations which solve any or all of the disadvantages of known depth sensing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A method of sensing depth using an RGB camera. In an example method, a color image of a scene is received from an RGB camera. The color image is applied to a trained machine learning component which uses features of the image elements to assign all or some of the image elements a depth value which represents the distance between the surface depicted by the image element and the RGB camera. In various examples, the machine learning component comprises one or more entangled geodesic random decision forests.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Described herein are systems and methods for obtaining depth information for a scene using a simple RGB camera. The system implements machine learning to correlate the R, G and B components of an image element (and that of its neighbors) and its three-dimensional (3D) depth. Such as system allows depth information to be obtained in a very cost-effective and efficient manner allowing it to be implemented in low cost and low power devices such as mobile phones.

Although the present examples are described and illustrated herein as being implemented in an office or workspace image analysis system, the system described is provided as an example and not a limitation. As those skilled in the art will appreciate, the present examples are suitable for application in a variety of different types of image analysis systems.

Figure 1:
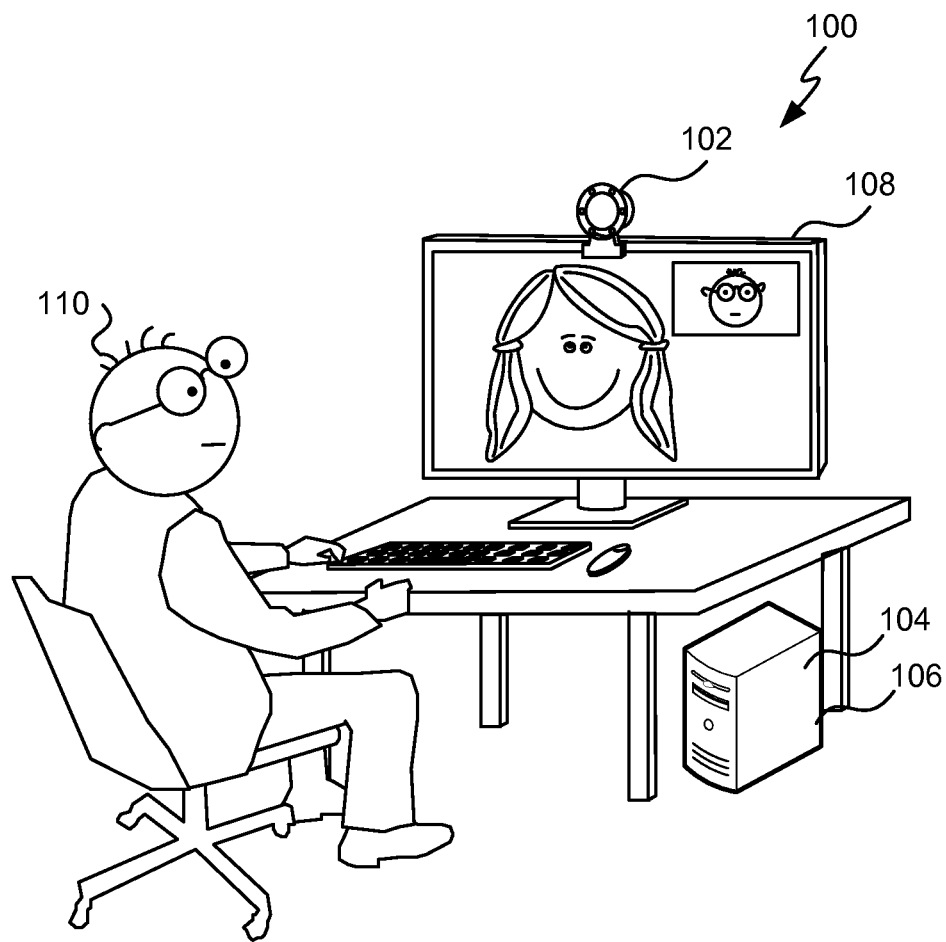
FIG. 1 is a schematic diagram of a depth sensing system.

Reference is now made to FIG. 1, which illustrates an example depth sensing system 100. In this example, the system 100 comprises an RGB camera 102 arranged to capture one or more color images of a scene comprising one or more surfaces; and a computing-based device 104 in communication with the RGB camera 102 configured to generate depth maps from the color images without input from a depth camera. In some cases the system 100 may generate one depth map for each RGB image generated by the RGB camera 102. In other cases the system 100 may combine or use information from multiple RGB images to generate a single depth map (e.g. the system 100 may use information about an RGB image and the successive RGB image to generate a depth map resulting in N−1 depth maps for N RGB images); interpolate between successive RGB images to generate multiple depth maps; and/or combine RGB images from multiple RGB cameras to produce a single depth map.

In FIG. 1, the RGB camera 102 is mounted on a display screen 108 above and pointing horizontally at the scene including the user 110. However, this is one example only. Other locations for the RGB camera 102 may be used such as on the desktop looking upwards or other suitable locations.

The computing-based device 104 shown in FIG. 1 is a traditional desktop computer with a separate processor component 106 and display screen 108, however, the methods and systems described herein may equally be applied to computing-based devices 102 wherein the processor component 106 and display screen 108 are integrated such as in a laptop computer, tablet computer or smart phone.

In various examples the computing-based device 104 has a passive relationship with the RGB camera 102. In particular, in these examples the computing-based device 104 is capable of receiving color or RGB images from the RGB camera 102, but the computing-based device is not able to control the RGB camera 102. For example, in these cases the computing-based devices is not able to control the direction of the camera.

Although the scene of FIG. 1 comprises a person 110 at a desk, a person of skill in the art will appreciate that the methods and systems described herein may be equally applied to other scenes.

Although FIG. 1 illustrates an RGB camera 102 mounted on a stationary object (i.e. display 108), in other examples the RGB camera 102 may be mounted on or otherwise affixed to a moving object such as a person or a robot.

Figure 2:
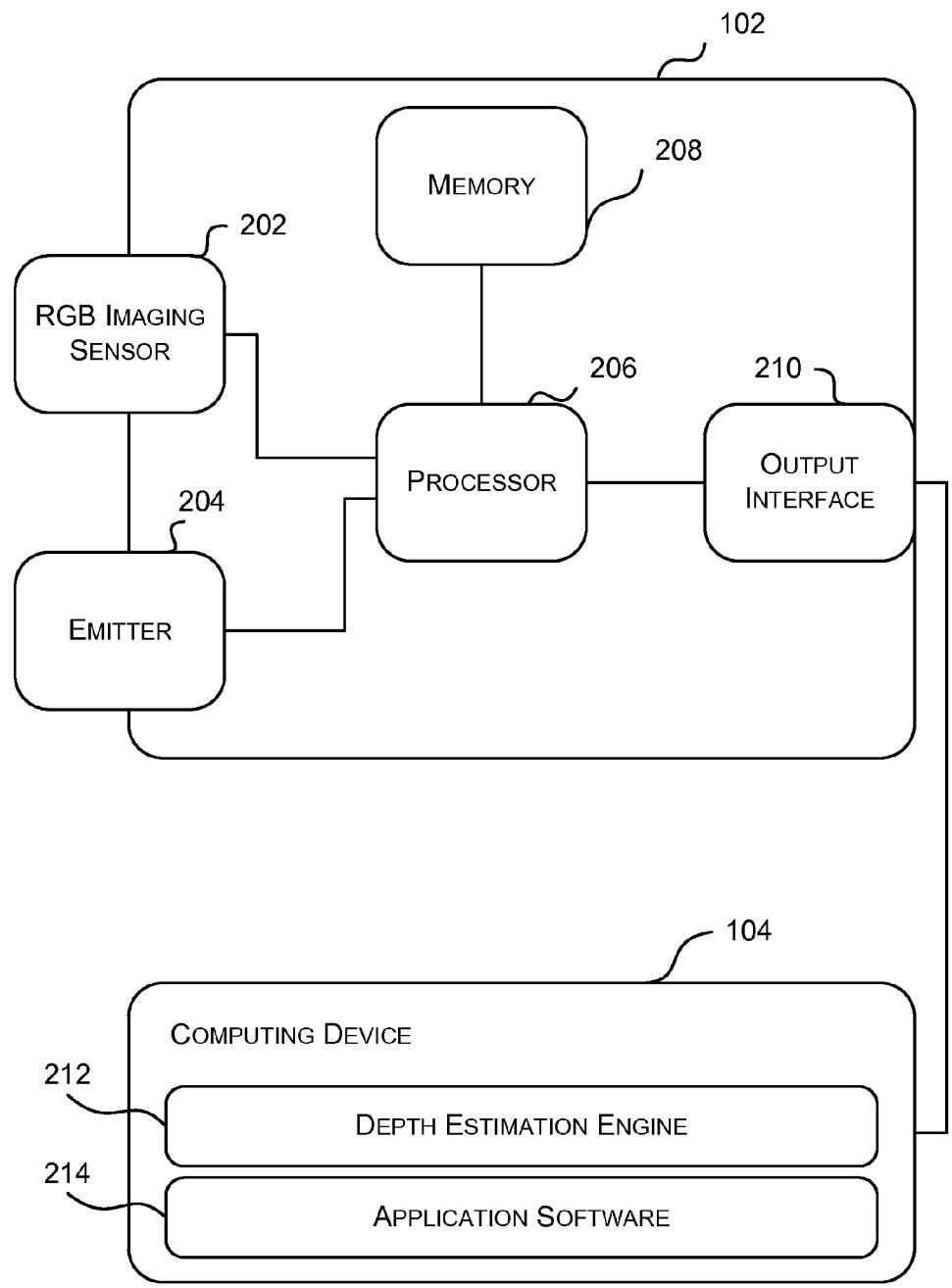
FIG. 2 is a schematic diagram of the RGB camera and computing-based device of FIG. 1.

Reference is now made to FIG. 2, which illustrates a schematic diagram of an RGB camera 102 that may be used in the system 100 of FIG. 1.

The RGB camera 102 comprises at least one RGB imaging sensor 202 for capturing RGB or color images of the scene. The RGB camera 102 may also comprise an emitter 204 for illuminating the scene.

The RGB camera 102 may also comprise at least one processor 206, which is in communication with the RGB imaging sensor 202 and the emitter 204 (if present). The processor 206 may be a general purpose microprocessor or a specialized signal/image processor. The processor 206 is arranged to execute instructions to control the RGB imaging sensor 202 and emitter 204 (if present) to capture RGB images of the scene. The processor 206 may optionally be arranged to perform processing on these images and signals, as outlined in more detail below.

The RGB camera 102 may also include memory 208 arranged to store the instructions for execution by the processor 206, images or frames captured by the RGB camera 202, or any suitable information, images or the like. In some examples, the memory 208 can include random access memory (RAM), read only memory (ROM), cache, Flash memory, a hard disk, or any other suitable storage component. The memory 208 can be a separate component in communication with the processor 206 or integrated into the processor 206.

The RGB camera 102 may also include an output interface 210 in communication with the processor 206. The output interface 210 is arranged to provide the image data to the computing-based device 104 via a communication link. The communication link can be, for example, a wired connection (e.g. USB™, Firewire™, Ethernet™ or similar) and/or a wireless connection (e.g. WiFi™, Bluetooth™ or similar). In other examples, the output interface 210 can interface with one or more communication networks (e.g. the Internet) and provide data to the computing-based device 104 via these networks.

The computing-based device 104 may comprise a depth estimation engine 212 that is configured to generate a depth map from the image data received from the RGB camera 102. The depth map is generated from a trained machine learning component that has been trained to map the R, G, and B components of an RGB image element (and surrounding image elements) to a depth value.

The depth map comprises, for each image element of the RGB image, a depth value that represents the absolute distance between the surface in the scene depicted by the individual image element and the RGB camera 102. An image element is a unit of an image such as a pixel, a voxel, a group of pixels or voxels. An example method which may be used by the depth estimation engine 212 for generating the depth map will be described with reference to FIG. 4.

Application software 214 may also be executed on the computing-based device 108 which may use the output of the depth estimation engine 212 (e.g. depth map). For example, the computing-based device 104 may comprise a segmentation engine which uses the depth map to segment the image. In some cases this may be used to segment the foreground of an image from the background of an image.

Figure 3:
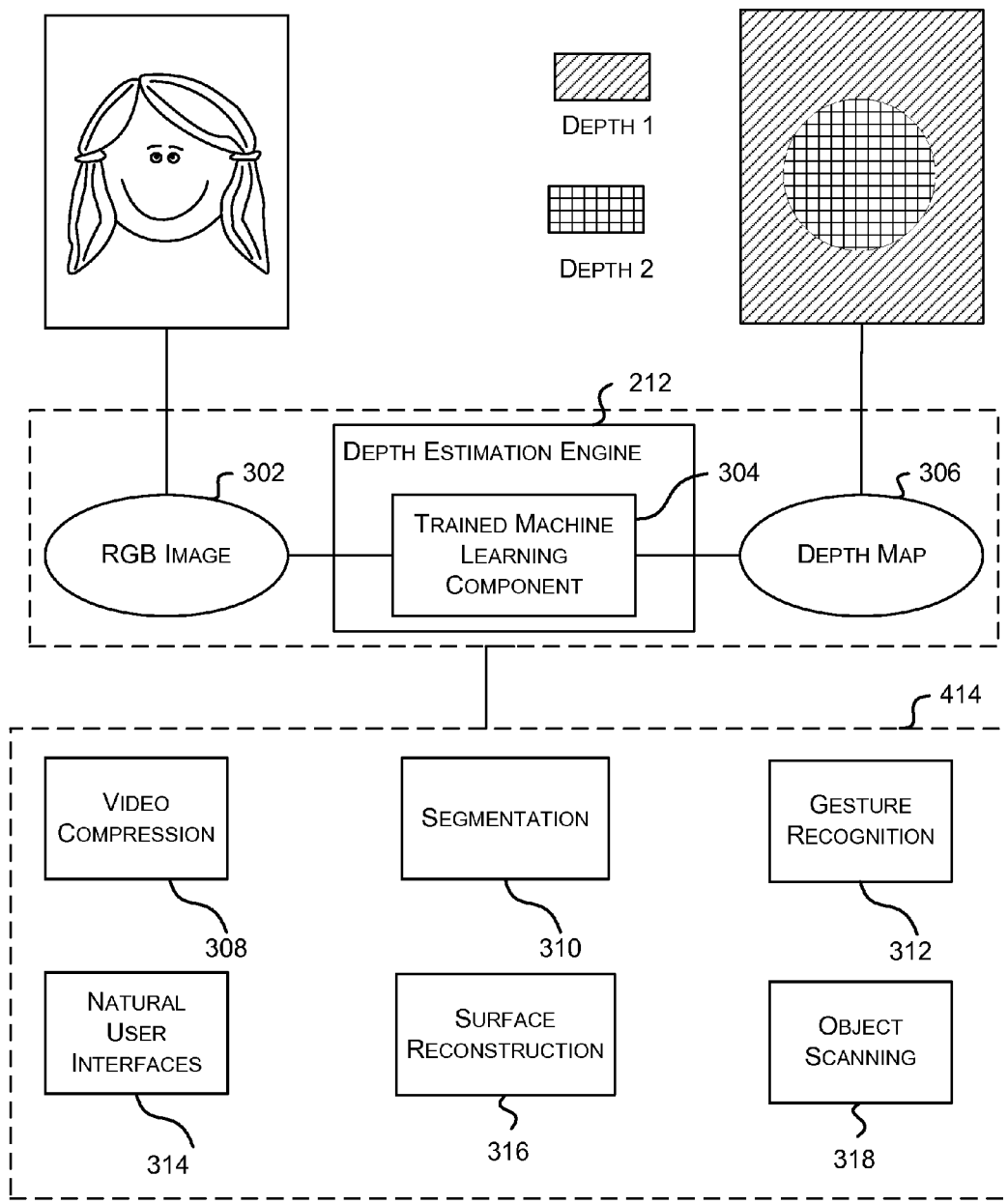
FIG. 3 is a schematic diagram of the depth estimation engine of FIG. 2.

Reference is now made to FIG. 3 which is a schematic diagram of the depth estimation engine 212 of FIG. 2. As described above, the depth estimation engine 212 receives an RGB image 302 and applies it to a trained machine learning component 304 to produce a depth map 306. In some examples the trained machine learning component may comprise one or more random decision forests. In other examples, other suitable machine learning components may be used such as, but not limited to, a deep neural network, a support vector regressor, and a Gaussian process regressor. As described above the depth map comprises a depth value for each image element of the RGB image 302. The depth value represents the absolute distance between the surface represented by the image element in the image and the RGB camera 102.

The depth estimation engine 212 of FIG. 2 may be integral with, or in communication with functionality that uses the depth image. For example, any of a video compression 308, segmentation 310 (e.g. for background removal); gesture recognition (e.g. to identify gestures performed by the user); natural user interface 314 (e.g. to control the operation of a computer in conjunction with for example gesture recognition), surface reconstruction 316 and object scanning 318 may be configured to use the depth map generated by the depth estimation engine 212.

Figure 4:
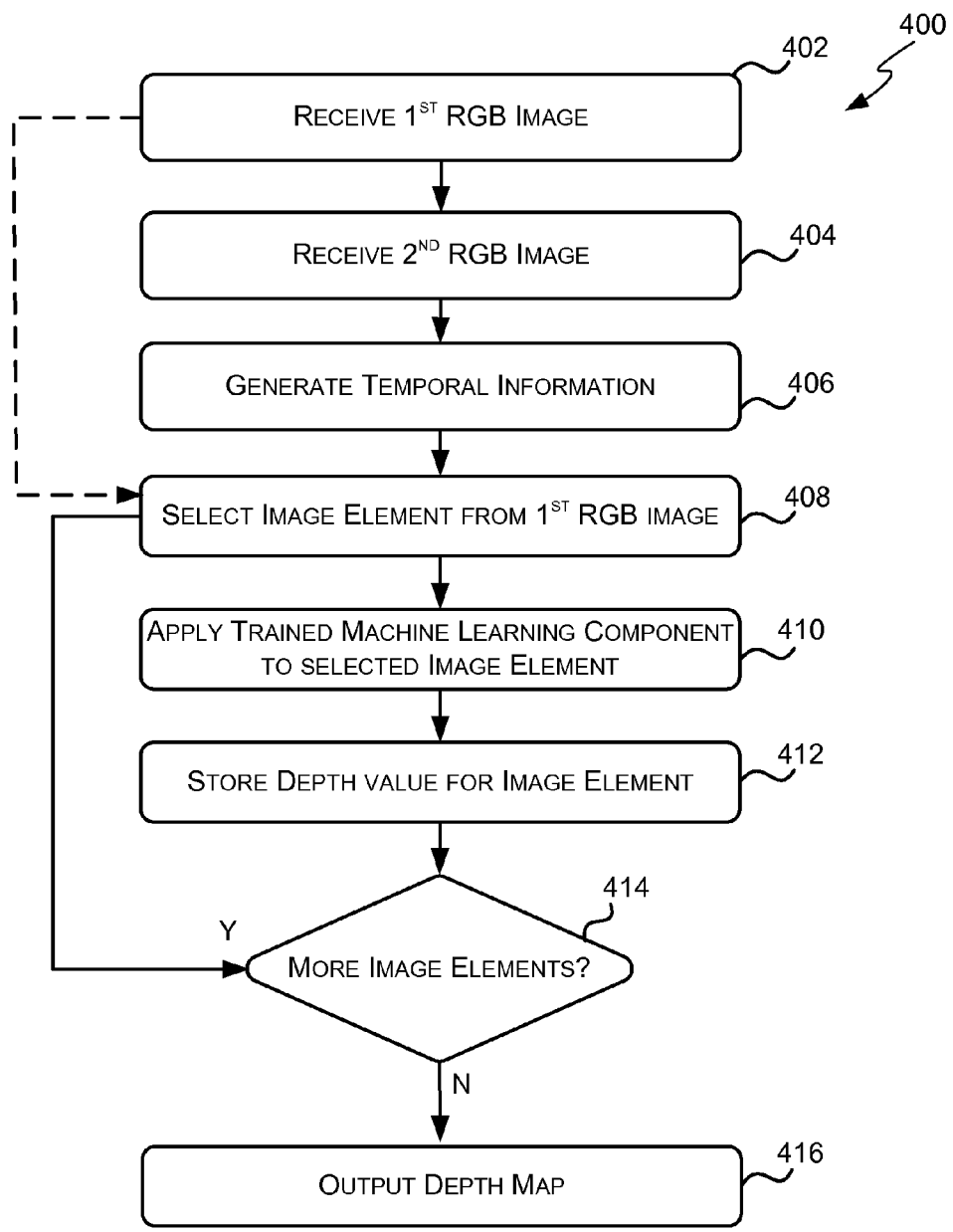
FIG. 4 is a flow chart of a method for generating a depth map from an RGB image.

Reference is now made to FIG. 4 which is a flow diagram of an example method 400 for generating a depth map from RGB images. The method 400 is described as being carried out by the depth estimation engine 212 of FIG. 2, however, in other examples all or part of this method 400 may be carried out by one or more other components.

At block 402, the depth estimation engine 212 receives a first RGB image of a scene. The first RGB image is comprised of a plurality of image elements each of which has a red (R), green (G) and blue (B) value. In some cases once the depth estimation engine 212 has received the first RGB image of the scene the method proceeds to block 404 where a second RGB image is received prior to processing the first RGB image. In other cases, once the depth estimation engine 212 has received the first RGB image the method 400 proceeds directly to block 408 where the received RGB image is processed.

At block 404, the depth estimation engine 212 receives a second RGB image of the scene which temporally follows the first RGB image (i.e. it is the next RGB image in a video sequence). The second RGB image is also comprised of a plurality of image elements each of which have an R, G and B value. Once the second RGB image is received, the method 400 proceeds to block 406.

At block 406, the depth estimation engine 212 generates temporal information for each image element of the first RGB image that indicates changes between the image elements of the first RGB image and the image elements of another RGB image (e.g. the second RGB image). The temporal information provides a sense of what is moving and aids in generation of a depth map. For example, if an image element has a high amount of motion with respect to surrounding image elements this can help to determine if the moving object is closer or further away from the RGB camera 102.

In some cases the temporal information comprises a temporal derivative, such as, but not limited to the difference in intensity between an image element in the first RGB image and the corresponding image element in another RGB image (e.g. the second RGB image). This can be expressed by the equation $I(x,y,t)-I(x,y,t-1)$ where I is the RGB image, x, is the horizontal location of the image element, y is the vertical location of the image element and t is time. In other cases, the temporal information may alternatively, or in addition to the temporal derivative, comprise optical flow information. Optical flow information estimates a flow vector per image element describing how that bit of the image has moved since the previous RGB image.

Once the depth estimation engine 212 has generated the temporal information it may associate the temporal information with the image elements of the first RGB image. Once the temporal information has been computed and associated with the first RGB image, the method 400 proceeds to block 408.

At block 408 the depth estimation engine 212 selects an image element from the first RGB image to be assigned a depth value. In some examples, the depth estimation engine 212 is configured to assign each image element of the first RGB image a depth value. In these examples the first time the depth estimation engine 212 executes this block it may select the first image element in the first RGB image and subsequent times it executes this block it may select the next image element in the RGB image. In other examples, however, the depth estimation engine 212 may be configured to assign a depth value to only a subset of the image elements in the RGB image. In these examples, the depth estimation engine 212 may use other criteria to select image elements to be assigned depth values. For example, the depth estimation engine 212 may only assign a depth value to every second image element. This produces a depth image with a lower resolution that the input RGB image. Once the depth estimation engine 212 has selected an image element to be assigned a depth value, the method 400 proceeds to block 410.

At block 410 the depth estimation engine 212 applies the machine learning component to the selected image element to estimate the depth value for the selected image element. The depth value represents the distance between the surface represented by the image element and the RGB camera 102. The depth value may be in the form of a set of probabilities that the depth of the image element falls within one of a plurality of depth ranges or bins. In some examples there are a high number of finely defined depth ranges or bins to provide a relatively accurate estimate of the depth value. In some examples the probability information may in the form of a histogram.

In some examples, the machine learning component assigns a depth value to the selected image element by pushing the image element through a trained random decision forest. Decisions are made at split nodes of the trees in the forest by computing comparisons between the image element and probe image elements displaced therefrom by spatial offsets as described in more detail below. When the image element reaches a leaf node, data stored at that leaf node during training is accessed. This is described in more detail below with reference to FIG. 11 and other figures.

In some cases the machine learning component comprise as classifier such as a random decision forest or Support Vector Machines (SVMs). However, it will be evident to a person of skill in the art that other machine learning components may also be used.

Once the selected image element has been assigned a depth value the method 400 proceeds to block 412.

At block 412, the depth estimation engine 212 stores the depth value generated in block 410 in a depth map. Once the depth value for the selected image element has been stored, the method 400 proceeds to block 414.

At block 414, the depth estimation engine 212 determines whether there are more image elements of the first RGB image to be assigned a depth value. Where the depth estimation engine 212 is configured to assign each image element of the RGB image a depth value then the depth estimation engine 212 may determine that there are more image elements to be assigned a depth value if not all of the image elements have been assigned a depth value. Where the depth estimation engine 212 is configured to assign only a subset of the image elements of the RGB image then the depth estimation engine 212 may determine there are more image elements to be assigned a depth value if there any image elements that do not have a depth value and meet the criteria used to determine which image elements are assigned a data value. If the depth estimation engine 212 determines that there is at least one image element still to be assigned a depth value, the method 400 proceeds back to block 408. If, however, the depth estimation engine 212 determines that there are no image elements left to be assigned a depth value the method 400 proceeds to block 416.

At block 416, the depth estimation engine outputs the depth map. As described above the depth map may be used to segment the image to, for example, distinguish the foreground from the background.

In some cases the method 400 may further comprise performing a smoothing function on the depth map to ensure that neighboring image elements have similar depth values.

Although the analysis of the image elements in the first RGB image is described as being completed sequentially or serially it will be evident to a person of skill in the art that the analysis of the image elements may be performed in parallel.

Figure 5:
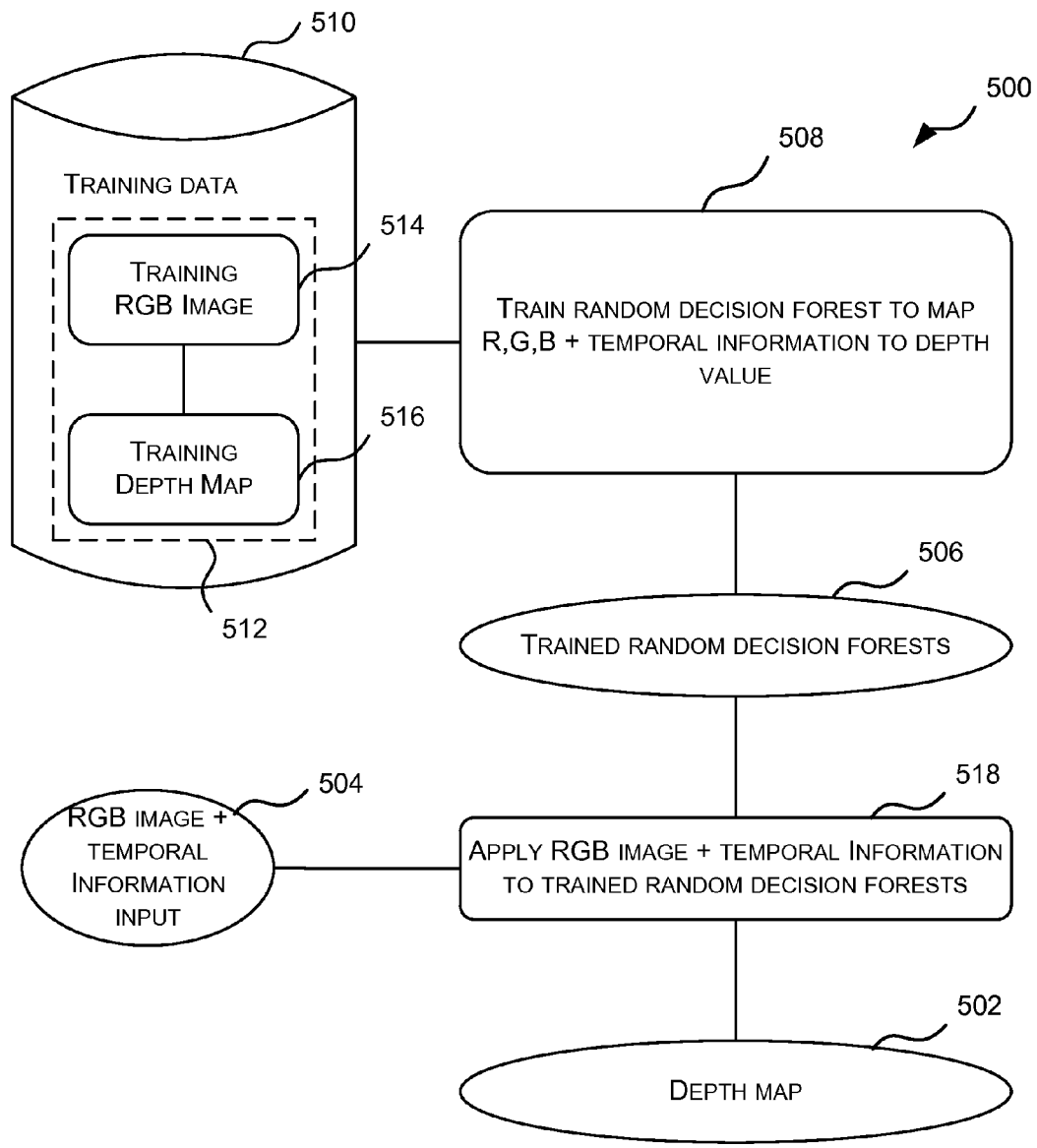
FIG. 5 is a schematic diagram of method of generating a depth map from an RGB image using one or more random decision forests.

Reference is now made to FIG. 5 which illustrates an example method 500 for generating a depth map 502 from an RGB image 504 wherein the trained machine learning component 404 comprises one or more trained random decision forests 506.

The random decision forests 506 are trained to map a given image element (e.g. pixel) in an RGB image to an absolute depth value. As described above the depth value represents the distance between the surface represented by the image element in the RGB image and the RGB camera 102.

The random decision forests 506 may be created and trained in an offline process 508 that receives as training data 510 pairs 512 of RGB images 514 and corresponding depth maps 516. An example method for training a random decision forest 506 will be described with reference to FIG. 9. The random decision forests 506 may be stored at the computing-based device 104 or any other entity in the system or elsewhere in communication with the computing-based device 104.

Once the trained random decision forests 506 have been generated they can be applied 518 to an RGB image that may include or be associated with temporal information 504 to produce a depth map 502. The trained random decision forests 506 generate a depth map in a fast, simple manner which is not computationally expensive and which may be performed in real time or near real time on a live video feed from the RGB camera 102 of FIG. 1 even using conventional computing hardware in a single-threaded implementation.

Figure 6:
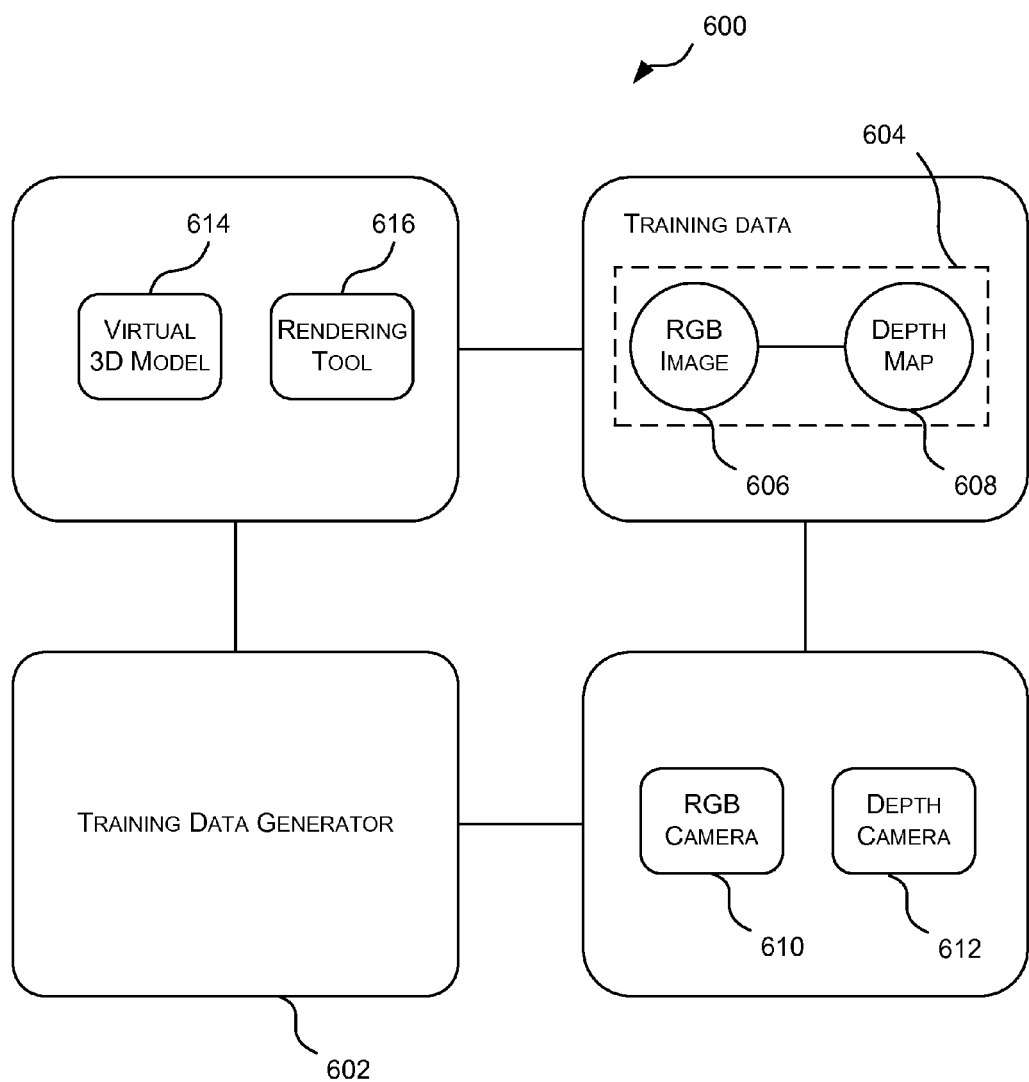
FIG. 6 is a schematic diagram of an apparatus for generating training data for a random decision forest.

Reference is now made to FIG. 6 which illustrates a process for generating the training data for the random decision forests. A training data generator 602 (which may be computer-implemented) generates training data which comprises many pairs 604 of data, each pair 604 comprising an RGB image 606 and a ground truth depth map 608 corresponding to the RGB image 606 where each image element of the RGB image 606 has an associated depth value in the depth map 608. The variety of objects in the training images and configuration and orientations of those objects is as wide as possible according to the application domain, storage and computing resources available.

The pairs of RGB image and depth maps 604 may be generated from a real physical setup. In some cases, as shown in FIG. 6, the corresponding RGB image and depth maps may be obtained from an RGB camera 610 and a depth camera 612 that are mounted side by side and synchronized so as to capture color and depth information simultaneously. In other cases, the corresponding RGB images and depth maps may be obtained from a single camera that is capable of providing registered and synchronized RGB and depth images.

In some cases the real physical setup may be randomly perturbed by, for example, adding photometric and geometric variations, and inserting random background to allow the system 100 to be trained to be invariant to these types of variations.

The pairs of RGB images and depth maps 604 may also, or alternatively, be synthetically generated using computer graphics techniques. For example, a computer system 602 may have access to a virtual 3D model 614 of an object and to a rendering tool 616. Using the virtual 3D model the rendering tool 616 may be arranged to automatically generate a plurality of high quality RGB images and depth maps.

Once the pairs of images have been created the computer system 602 may analyze the RGB images to generate temporal information which is included or associated with the RGB images.

Figure 7:
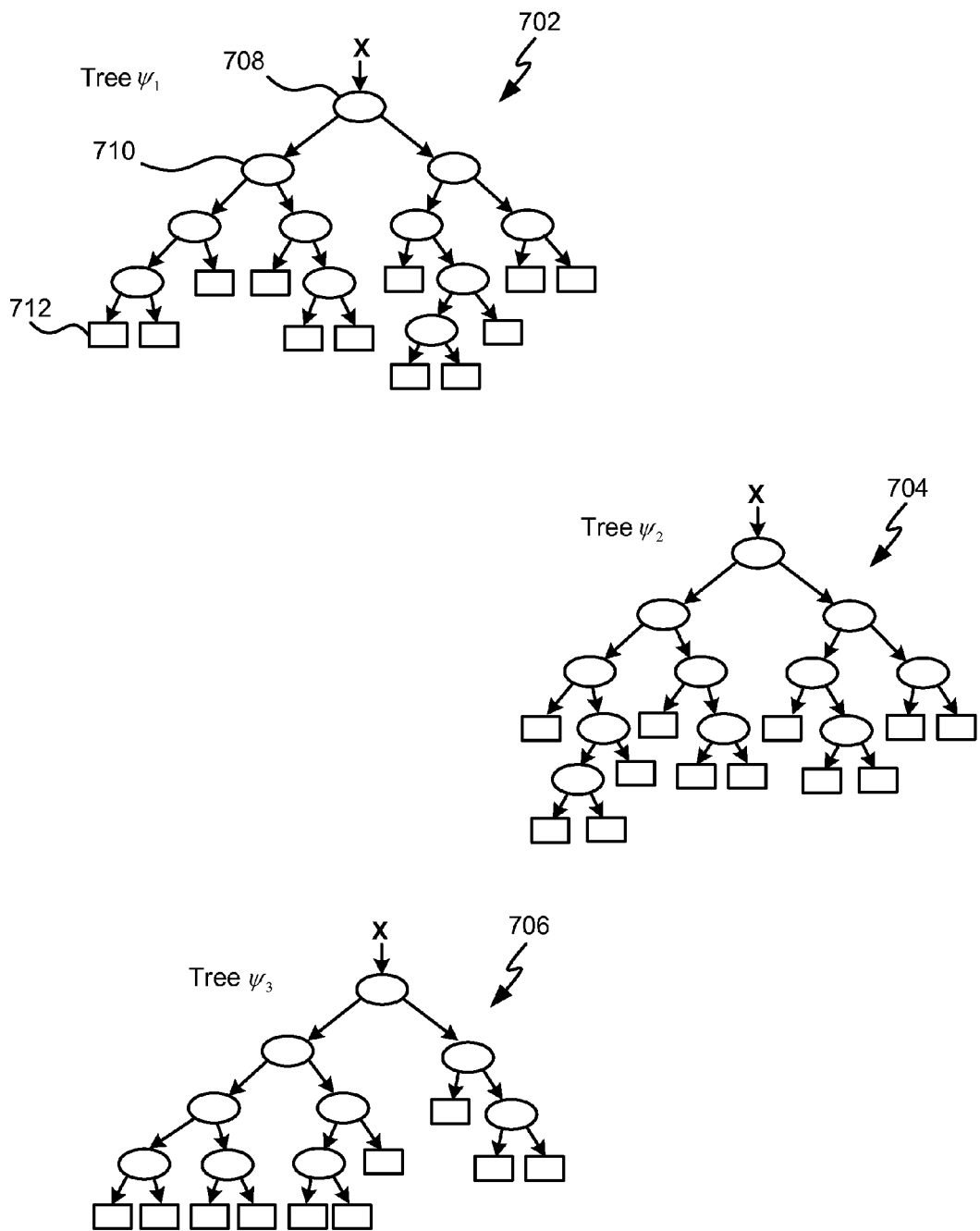
FIG. 7 is a schematic diagram of a random decision forest.

Reference is now made to FIG. 7 which is a schematic diagram of a random decision forest comprising three random decision trees 702, 704 and 706. Two or more random decision trees may be used. Three are shown in this example for clarity. A random decision tree is a type of data structure used to store data accumulated during a training phase so that it may be used to make predictions about examples previously unseen by the random decision tree. A random decision tree is usually used as part of an ensemble of random decision trees (referred to as a forest) trained for a particular application domain in order to achieve generalization (that is being able to make good predictions about examples which are unlike those used to train the forest). A random decision tree has a root node 708, a plurality of split nodes 710 and a plurality of leaf nodes 712. During training the structure of the tree (the number of nodes and how they are connected) is learned as well as split functions to be used at each of the split nodes. In addition, data is accumulated at the leaf nodes during training.

Image elements of an RGB image may be pushed through trees of a random decision forest from the root to a leaf node in a process whereby a decision is made at each split node. The decision may be made according to characteristics or features of the image element being analyzed and characteristics or features of image elements displaced from the original image element by spatial offsets specified by the parameters of the split node.

At a split node the data point proceeds to the next level of the tree down a branch chosen according to the results of the decision. During training, parameter values (also referred to as features) are learnt for use at the split nodes and data comprising depth value votes is accumulated at the leaf nodes.

In various examples the machine learning component comprises one or more of the following to reduce the amount of memory required by the machine learning component: a random decision forest with merged nodes, a random decision forest with auto-context, an entangled random decision forest and a multi-layered decision forest.

As is known to those of skill in the art an entangled random decision forest is a random decision forest where at least one decision tree has split nodes at a specified level which accumulate data during training which is issued to derive features for making decisions at least one lower level of the tree. A plurality of random decision forests have auto-context where output from one random decision forest is available to enable decisions to be made at split nodes in at least one other random decision forest. In a multi-layered random decision forests the output of one random decision forest is used to select subsequent random decision forests and/or outputs from subsequent random decision forests.

In various examples, the machine learning component comprises an entangled geodesic random decision forest. An entangled geodesic random decision forest is one that used geodesic features to make decisions at the nodes. A geodesic feature describes a distance between image elements, the distance taking into account information about image content between the image elements. The geodesic features may be calculated with respect to a probabilistically defined image region and may be computed using edge maps, using a gradient of an image quantity such as color or other information about image content. The geodesic features may be referred to as connectivity features as they describe how image elements at different locations in an image are connected via paths in the image. The paths may be shortest paths from an image element to a closest point in a probabilistically defined region of the image.

Figure 8:
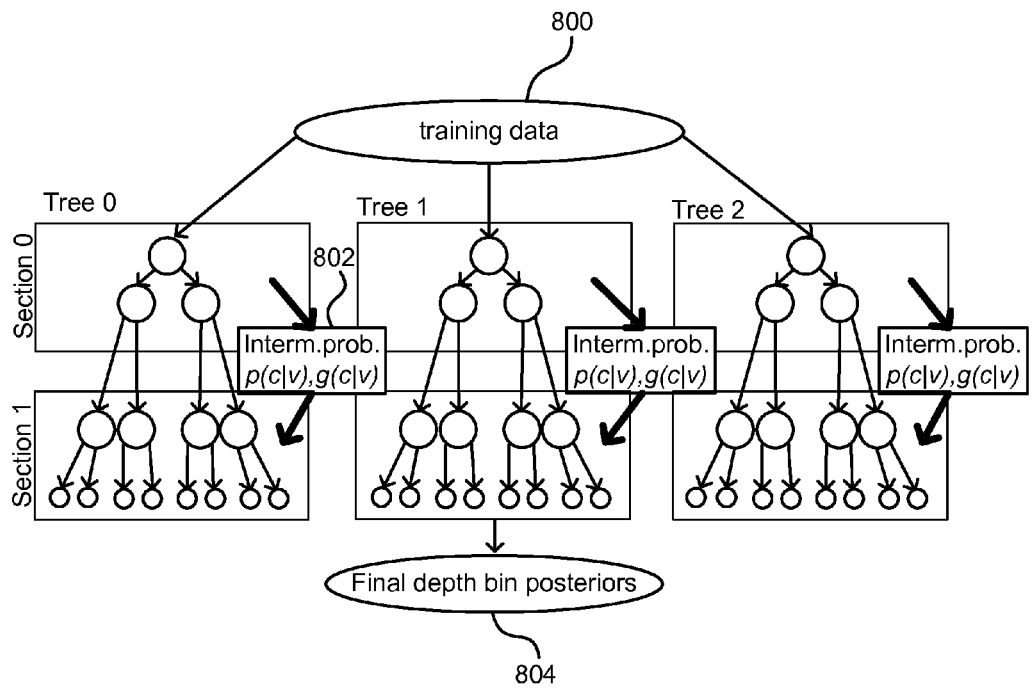
FIG. 8 is a schematic diagram of an entangled random decision forest.

FIG. 8 is a schematic diagram of an entangled geodesic random decision forest comprising three random decision trees: tree 0, tree 1, tree 2. In practice there may be more random decision trees in the forest. Each random decision tree comprises two (or more) sections: section 0 and section 1. A section comprises two or more layers of nodes. In this example each section has two layers of nodes although more layers may be used. During training, training data 800 may be used to train the trees in parallel. Once the training data reaches the lowest layer of section 0 it may be used to compute intermediate depth bin probabilities $p(c|v)$ and generalized geodesic distances g(c|v). These derived features 802 may be used as input features to train section 1 of the trees in addition to the raw features (i.e. R, G, B and temporal information) 800. The training data reaching the leaf nodes of each tree is assigned a probability for each depth bin and may be aggregated over the trees by depth range or bin to give a final depth range or bin probability distributions 804 which may be stored in a compact form. More detail about how an entangled random decision forest may be trained to produce depth values from RGB image data and how it may be used at test time is given below with reference to FIGS. 9 to 11.

Figure 9:
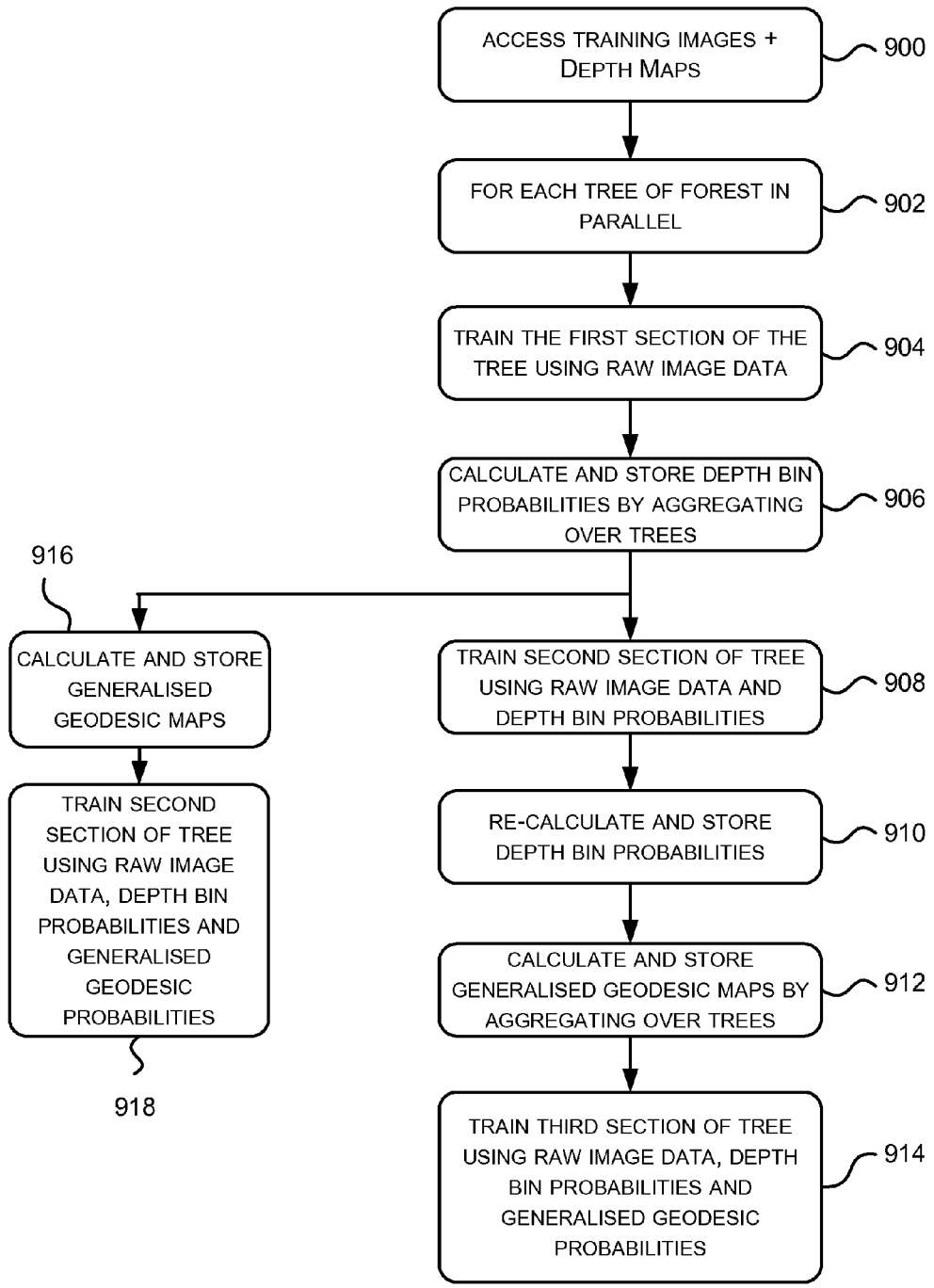
FIG. 9 is a flow diagram of a method of training an entangled random decision forest.

FIG. 9 is an example of a method of training an entangled geodesic random decision forest for the task of creating a depth map from RGB images. Pairs of training RGB images and depth maps are accessed 900.

For each tree of the forest in parallel 902 the training procedure trains 904 the first section of each tree using raw image data (i.e. R, G, B and temporal information). Once the first sections of each tree are trained, training data reaching the nodes at the lowest level of the first section of each tree is known. This training data is assigned a depth value and may be aggregated across the trees 906 by depth bin or range to give depth range or bin probabilities. The depth bin or range probabilities may be referred to as intermediate depth bin or range probabilities because they are computed at a level of the tree which is higher than the leaf nodes. The depth bin or range probabilities may be stored in a compact manner.

The training procedure trains 908 the second sections of each tree in parallel using the raw image data (i.e. R, G, B, temporal information) and also using the intermediate depth bin or range probabilities to make decisions at split nodes. Once the second sections are trained the training procedure recalculates 910 and stores the depth bin or range probabilities. Because a lower level of each tree is now reached the intermediate depth bin probabilities are more certain. The training procedure is able to use the intermediate depth bin or range probabilities to calculate and store 912 generalized geodesic maps (one for each depth bin). A generalized geodesic map comprises a numerical value at an image element location indicating a geodesic distance of that image element location from a probabilistically defined seed region. The seed region may be image elements likely to depict objects with a specified depth range. A third section of each tree may be trained 914 using the raw image data, the intermediate depth bin probabilities and the generalized geodesic maps.

Given an image J and a real-valued object "soft mask" (that encodes image element likelihood) $M(p), \Omega \in N^d \rightarrow [0,1]$ a generalized geodesic distance Q may be defined as shown in equation (1):

$$Q(p, c'M, \nabla J) = \min_{p' \in \Omega} (\delta(p, p') + vM(p', c)) \quad (1)$$

with the geodesic distance $\delta$ between two image elements p and q as shown in equation (2):

$$\delta(p, q) = \inf_{\Gamma \in P_{p,q}} \int_0^{l(\Gamma)} \sqrt{1 + \gamma^2} \, (\nabla J(s) \cdot \Gamma'(s))^2 \, ds \quad (2)$$

where $\Gamma$ is a path connecting the two image elements p and q and $P_{p,q}$ is the set of possible paths joining them.

The generalized geodesic maps may be computed using parallel processing as described in detail in US patent application US 2011/0145826 entitled "Parallel processing for distance transforms" which was published on 16 Jun. 2011. However, it is not essential to compute the generalized geodesic maps in this manner. Any method of calculating the generalized geodesic distances may be used.

Other numbers of sections may be used in the trees of the forest. For example, where two sections are used the training procedure at step 906 also computes 916 and stores the generalized geodesic maps. Second sections of the trees may then be trained 918 using the raw image data, the intermediate depth bin probabilities and the generalized geodesic maps to make decisions at split nodes.

Figure 10:
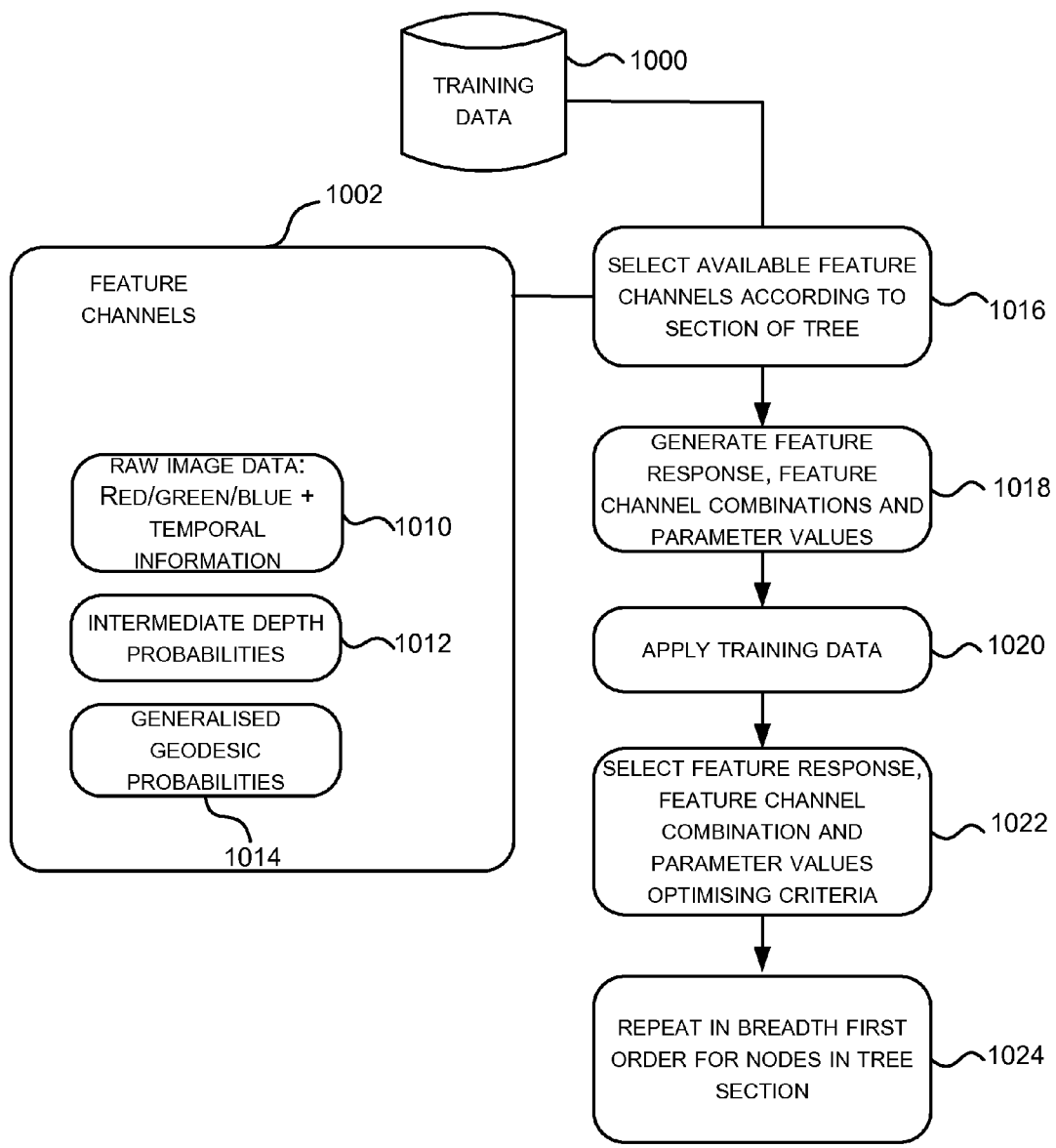
FIG. 10 is a flow diagram of more detail of part of the method of FIG. 9.

FIG. 10 is a flow diagram showing more detail of the training process of FIG. 9 during the steps 904, 908, 914, 918 when a specified section of the trees is trained. During those steps the tree sections are trained split node by split node in breadth first order. Training data 1000 reaches a given split node from either the root node or an earlier split node and comprises image elements for which the depth value is known. The training process selects 1016 available feature channels 1002 according to which section of the tree is being trained. A feature channel is a type of feature (describing a characteristic of an image) computed using a specified image quantity.

Examples of feature channels are now given although other types of feature channels may be used. In the case of RGB images, a feature channel may be raw image data 610 obtained from any one or more of R, G or B color channels of the raw images. A feature channel may comprise intermediate depth bin probabilities 1012 per depth bin. A feature channel may comprise generalized geodesic maps 1014. Other feature channels that may be used include, but are not limited to, optical flow based features (e.g. the flow component at an offset image element); raw image features of RGB images that precede the current image by more than a single image; the size of objects in the image of roughly fixed scale such as faces, cars etc.; the amount of movement of objects in the image (e.g. foreground objects typically move more than background objects in office scenes); the sharpness of objects in the image (e.g. the sharpness of an object may be based on how close the object is to the focal depth of the camera); SIFT (scale invariant feature transform); HOG (histogram of oriented gradients); and outputs of filter banks.

Available feature channels at a first section of a tree may be raw image data in any of the red, green, blue or temporal information channels. At the second section of a tree the available feature channels may be as for the first section and in addition, intermediate depth bin probabilities. At the third section of a tree the available feature channels may also include generalized geodesic maps for each possible depth bin. These are examples only and other combinations of feature channels may be available according to the tree sections.

The training process generates (using a random sampling process or in other ways) combinations of feature responses, feature channels and parameter values. Examples of possible feature responses which may be used include differences between pairs of probe image element locations in the given feature channel, sums between pairs of probe image element locations in the given feature channel, and absolute differences between pairs of probe image element locations in the given feature channel. As described above the probe image element locations are offset from a reference image element location according to at least some of the parameter values. It is not essential to use pairs of probe image elements; other numbers of probe image elements may be used including single probe image elements compared against the reference location.

The training process applies 1020 the training data to the generated combinations of feature responses, feature channels and parameter values. Some of the parameters may be thresholds against which the feature responses are compared in order to decide which branch of the tree the training data will take. The training process selects 1022 an optimal combination of the feature responses, feature channels and parameter values using optimizing criteria. The selected combination is stored for use at the split node during test time.

The training process repeats the process of FIG. 10 for the split nodes of the section of the tree being trained in breadth first order or any other suitable order.

The optimizing criteria may be a measure of information gain, a reduction in variance objective, or another training objective.

Figure 11:
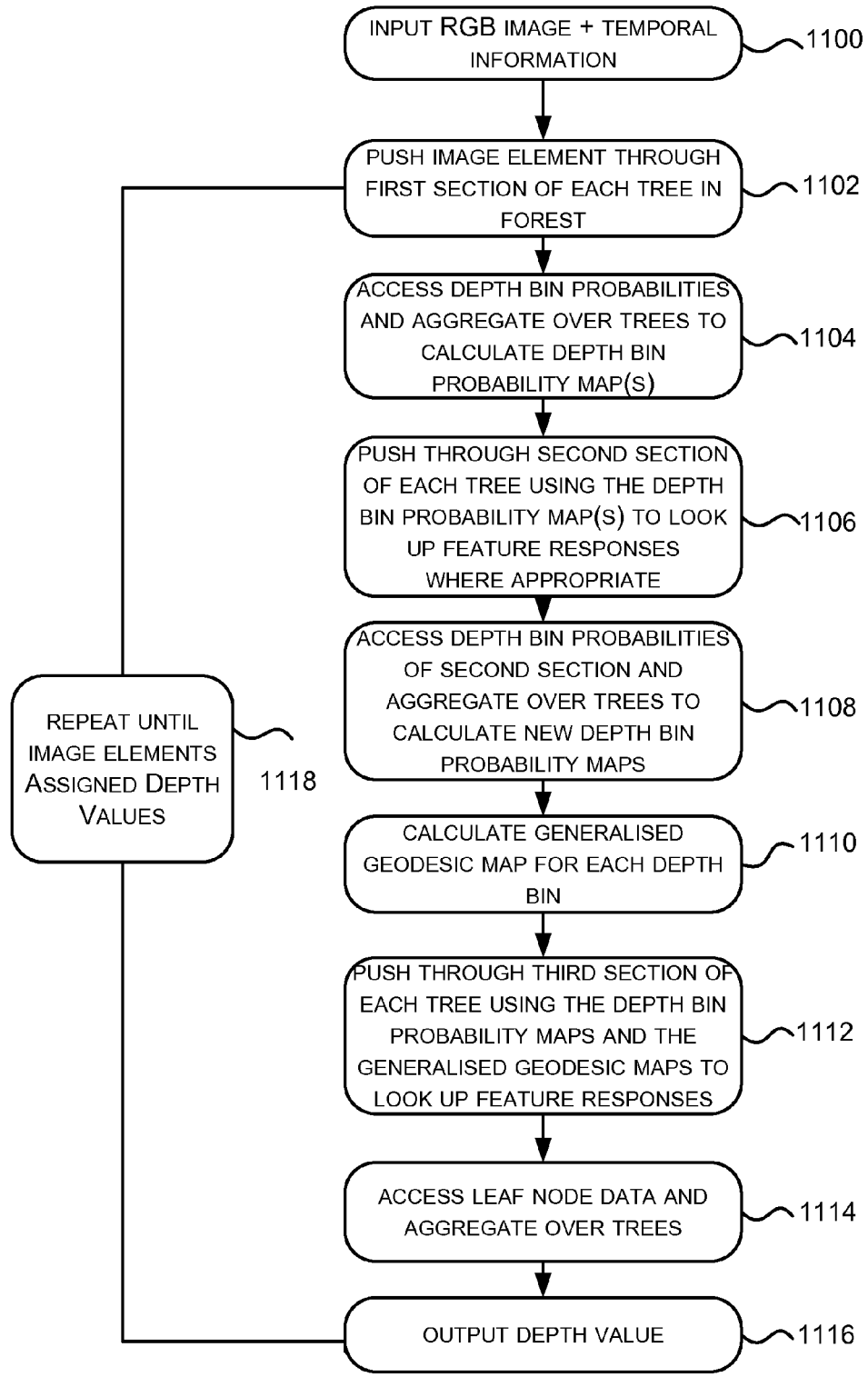
FIG. 11 is a flow diagram of a method of using a trained entangled random decision forest to generate a depth map from an RGB image.

Reference is now made to FIG. 11 which shows the use of a trained entangled geodesic random decision forest to generate a depth map from an RGB image. A test RGB image is accessed 1100 and image elements from the test image are pushed 1102 through the first section of each tree in the forest to identify one node at the bottom level of the first section in each tree. The training data accumulated at the identified nodes during training is accessed and aggregated 1104 over the trees to calculate a depth bin probability map. This has, at each image element location, an intermediate probability value for each depth bin, and optionally a geodesically smoothed version of that probability.

The RGB image elements are pushed 1106 through the next section of each tree. The depth bin probability map is used to look up feature responses where appropriate. The RGB image elements reach one node at the bottom level of the second section in each tree. The training data accumulated at the identified nodes during training is accessed and aggregated 1108 over the trees to calculate an updated depth bin probability map. Using this map to provide soft, probabilistic seed regions or masks, generalize geodesic maps are computed 1110, one for each depth bin.

The RGB image elements are pushed 1112 through the third section of each tree using the depth bin probability map and the generalized geodesic maps to look up feature responses. Eventually the RGB image elements reach one leaf node of each tree. The data associated with the identified leaf nodes is accessed and aggregated 1114 over the trees and a depth value is output 1116. The process repeats or is computed in parallel 1118 for other image elements of the RGB image until all the image elements are assigned a depth value.

By using look ups into the depth bin probability and geodesic maps to compute the feature responses it is possible to speed up processing The example described with reference to FIGS. 10 and 11 is one possible arrangement. It is also possible to use other combinations and sequences of geodesic and non-geodesic sections in the random decision trees.

Figure 12:
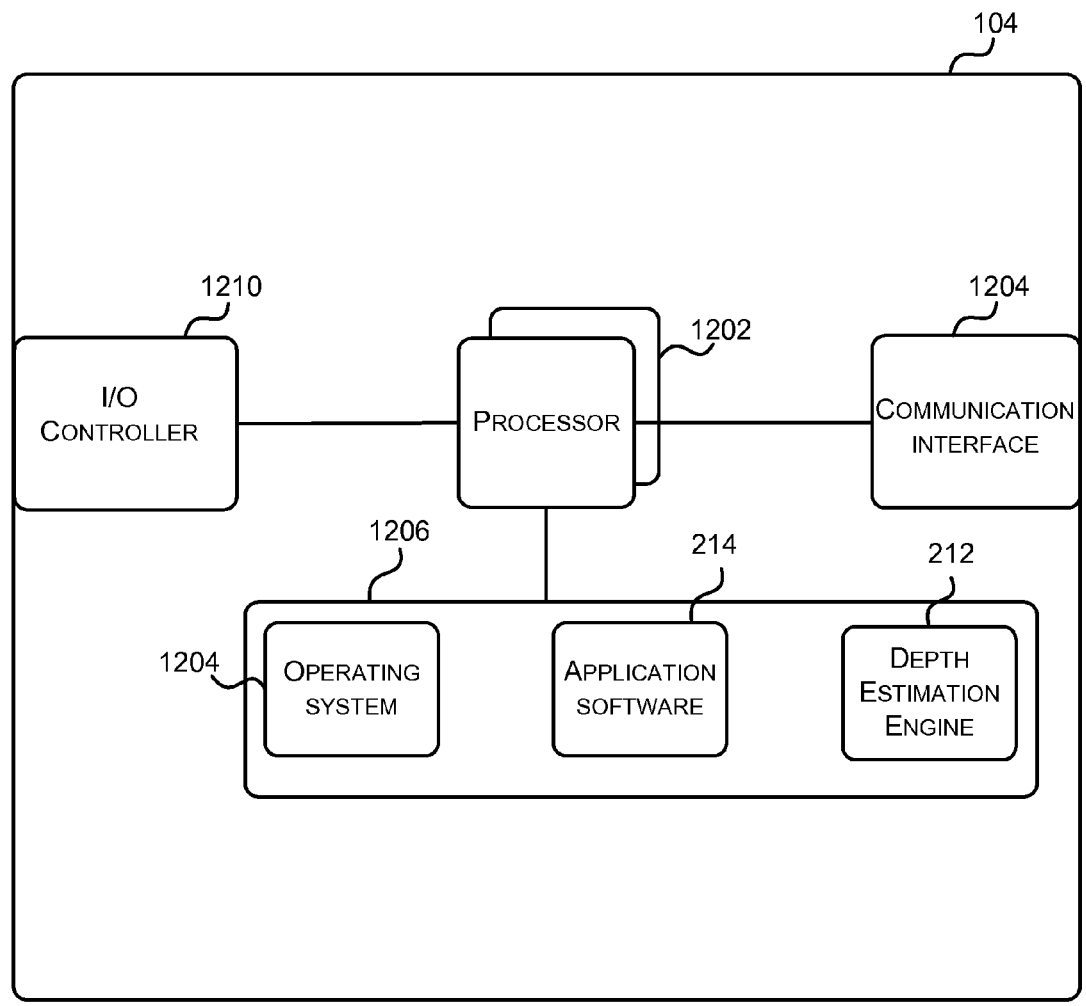
FIG. 12 illustrates an exemplary computing-based device in which embodiments of the systems and methods described herein may be implemented.

FIG. 12 illustrates various components of an exemplary computing-based device 104 which may be implemented as any form of a computing and/or electronic device, and in which embodiments of the systems and methods described herein may be implemented.

Computing-based device 104 comprises one or more processors 1202 which may be microprocessors, controllers or any other suitable type of processors for processing computer executable instructions to control the operation of the device in order to assign depth values to image elements of an RGB image. In some examples, for example where a system on a chip architecture is used, the processors 1202 may include one or more fixed function blocks (also referred to as accelerators) which implement a part of the method of generating a depth map from RGB image data in hardware (rather than software or firmware). Platform software comprising an operating system 1204 or any other suitable platform software may be provided at the computing-based device to enable application software 214 to be executed on the device.

The computer executable instructions may be provided using any computer-readable media that is accessible by computing based device 104. Computer-readable media may include, for example, computer storage media such as memory 1206 and communications media. Computer storage media, such as memory 1206, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing-based device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1206) is shown within the computing-based device 104 it will be appreciated that the storage may be distributed or located remotely and accessed via a network or other communication link (e.g. using communication interface 1208).

The computing-based device 104 also comprises an input/output controller 1210 arranged to output display information to a display device 108 (FIG. 1) which may be separate from or integral to the computing-based device 108. The display information may provide a graphical user interface. The input/output controller 1210 is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). In an embodiment the display device 108 may also act as the user input device if it is a touch sensitive display device. The input/output controller 1210 may also output data to devices other than the display device, e.g. a locally connected printing device (not shown in FIG. 12).

The input/output controller 1210, display device 108 and optionally the user input device (not shown) may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of image processing comprising:
   receiving, at a processor, at least one color image from an RGB camera, the image being of a scene comprising a plurality of surfaces;
   applying the at least one color image to a trained machine learning component comprising at least one random decision forest; and
   receiving as output from the trained machine learning component, a depth map comprising, for individual image elements of the color image, distances from the RGB camera to the surfaces in the scene depicted by the individual image elements.

2. The method of claim 1, wherein the machine learning component was trained using pairs of color images and corresponding ground truth depth maps.

3. The method of claim 1, wherein the machine learning component has been trained to calculate a depth map from two successive RGB images.

4. The method of claim 1, wherein the machine learning component has been trained using pairs of color images and corresponding depth maps, the depth maps being empirically observed using a depth camera.

5. The method of claim 1, wherein the machine learning component has been trained using pairs of synthetically generated color images and corresponding synthetically generated depth maps.

6. The method of claim 1, further comprising, receiving, at the processor, a stream of color images from the RGB camera at a frame rate of the RGB camera; and using the machine learning component to calculate a stream of depth maps from the stream of color images, at least at the frame rate of the RGB camera.

7. The method of claim 1, further comprising applying the at least one color image to the machine learning component by sending the image to the machine learning component at a remote entity.

8. The method of claim 1, further comprising applying the at least one color image to the machine learning component at a hand held computing device comprising the RGB camera.

9. The method of claim 1, wherein the depth map is computed without the need for a depth camera.

10. The method of claim 1, wherein the at least one random decision forest includes an entangled geodesic random decision forest.

11. The method of claim 10, further comprising computing features at split nodes of the random decision forest, the features comprising comparisons between reference image elements and probe image elements.

12. The method of claim 1, further comprising reducing the size of the machine learning component by using at least one random decision forest with one or more of: merged nodes, auto-context, and a classification layer used to direct input between a plurality of expert forests.

13. The method of claim 1, further comprising storing the machine learning component in a hand held computing device.

14. The method of claim 1, wherein the trained machine learning component is arranged to classify the surfaces depicted in the color image into one of a plurality of depth bins, a depth bin being a range of distances from the RGB camera.

15. The method of claim 1, further comprising using the depth map in at least one of: video compression, segmentation for background removal, gesture recognition, natural user interface, surface reconstruction and object scanning.

16. The method of claim 1, wherein the machine learning component is stored in memory in one of a smartphone, a tablet computer and a laptop computer.

17. The method of claim 1, wherein the machine learning component uses raw image data from a particular color image and temporal derivative information derived from the particular color image and a subsequent color image to generate the depth map for the particular color image.

18. A system to process an image, the system comprising a computing-based device configured to:
receive at least one color image from an RGB camera, the image being of a scene comprising a plurality of surfaces;
apply the at least one color image to a trained machine learning component comprising at least one random decision forest; and
receive as output from the trained machine learning component, a depth map comprising, for individual image elements of the color image, distances from the RGB camera to the surfaces in the scene depicted by the individual image elements.

19. The system according to claim 18, the trained machine learning component comprising an entangled geodesic random decision forest.

20. A computer-implemented method of image processing comprising:
receiving, at a processor, at least one color image from an RGB camera, the image being of a scene comprising a plurality of surfaces;
applying the at least one color image to a trained machine learning component, the trained machine learning component comprising an entangled geodesic random decision forest; and
receiving as output from the trained machine learning component, a depth map comprising, for individual image elements of the color image, distances from the RGB camera to the surfaces in the scene depicted by the individual image elements.

* * * * *